US006876378B2

(12) United States Patent
Detmers et al.

(10) Patent No.: US 6,876,378 B2
(45) Date of Patent: Apr. 5, 2005

(54) APPARATUS FOR PRODUCING A PRINTING FORM

(75) Inventors: Andreas Detmers, Heddesheim (DE); Claus Harbach, Borgdorf (DE); Bernd Lassen, Mönkeberg (DE); Sven Mader, Dielheim (DE); Christian Meier, Schriesheim (DE); Burkhard Paasch, Wahlstorf (DE); Lars Paulsen, Hollingstedt (DE); Markus Uihlein, Heidelberg (DE); Bernhard Zintzen, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/444,543

(22) Filed: May 23, 2003

(65) Prior Publication Data

US 2003/0222969 A1 Dec. 4, 2003

(30) Foreign Application Priority Data

May 28, 2002 (DE) ........................................ 102 23 642

(51) Int. Cl.[7] .......................... B41J 2/435; F16C 11/06
(52) U.S. Cl. ....................................... 347/245; 403/114
(58) Field of Search ................................ 347/245, 257, 347/263; 403/56, 114; 385/134; 33/281, 286, 502; 384/49, 50, 494, 548

(56) References Cited

U.S. PATENT DOCUMENTS 4,409,738 A * 10/1983 Renander et al. ............. 33/281
4,925,288 A 5/1990 Harris ........................ 359/876
5,331,343 A 7/1994 Ono et al. .................. 347/257
5,367,323 A 11/1994 Winsor ....................... 347/242
5,717,451 A 2/1998 Katano et al. ............. 347/242
5,748,827 A * 5/1998 Holl et al. .................. 385/134
6,493,957 B1 * 12/2002 Takatsuji et al. ............. 33/502

FOREIGN PATENT DOCUMENTS

DE 42 26 027 A1 2/1994

OTHER PUBLICATIONS

Cabatic, S. D. et al.: "Catch Your Drift", Photonics Spectra, Jul. 2000, pp. 90–92, 94.

* cited by examiner

*Primary Examiner*—Hai Pham
(74) *Attorney, Agent, or Firm*—Laurence A. Greenberg; Werner H. Stemer; Gregory L. Mayback

(57) ABSTRACT

An apparatus for producing a printing form which, with little expenditure, permits exact beam alignment and positioning. The apparatus for producing the printing form contains a holder for at least one printing form blank, and at least one imaging module, which can be moved relative to the printing form blank and which contains at least one radiation source which, in order to produce image elements that accept printing ink, is aimed at the surface of the printing form blank and whose beam direction can be adjusted. The imaging module being accommodated in a six-point mounting in three bearing locations, each bearing location containing a spherical element and an associated bearing element and in each case the spherical element rests on it and, in order to adjust the beam direction, at least one element of one bearing location being disposed adjustably.

15 Claims, 7 Drawing Sheets

APPARATUS FOR PRODUCING A PRINTING FORM

BACKGROUND OF THE INVENTION

Field of the Invention

The invention relates to an apparatus for producing a printing form. The apparatus contains a holder for at least one printing form and at least one imaging module which can be moved relative to the printing form blank and which contains at least one radiation source. The radiation source, in order to produce image elements that accept printing ink, is aimed at a surface of the printing form blank and whose beam direction can be adjusted.

In order to produce the printing form, use is made of radiation sources, in particular lasers, whose beams are aimed at a radiation-sensitive layer on the printing form blank. When the radiation source is activated, an image point is produced or, in the negative process, a non-image point. The printing form blank can be fixed to a flat substrate, to the surface of a printing form cylinder or to the inner side of a hollow cylinder. In order to be able to cover the entire surface of the printing form blank, the radiation sources and the printing form blank are positioned relative to one another. In order to increase productivity, a plurality of radiation sources are used simultaneously.

In an apparatus shown in U.S. Pat. No. 5,717,451, four imaging heads are used, each of which contains a laser diode array. The imaging heads, together with the laser diode arrays, can in each case be positioned independently of one another in linear guides in a direction parallel to the axis of rotation of a printing form cylinder by a slide. While the printing form cylinder rotates, the imaging heads are positioned in the lateral direction, it being possible for a strip to be imaged by each imaging head. In order to avoid imaging errors, in particular connecting errors between two strips, the imaging heads are aligned exactly before imaging. In order to align the imaging heads, these are moved into a calibration position and the laser diodes are activated. The locations of the laser beams on a calibration surface are registered by a detector. If the beam direction of a laser diode array deviates from a predefined value, the relevant imaging head is pivoted in such a way that the deviations are corrected. Following pivoting, the position of an imaging head on a slide is fixed. The adjustment of the beam direction and the fixing of the imaging head have to be carried out accurately to a few microns and reproducibly. In order to implement this, extremely fine precision mechanical adjustments and highly accurate mountings are known. In an imaging configuration according to U.S. Pat. No. 5,367,323, the mount of a deflection mirror is mounted in an articulated manner by a sphere and tilted to a certain extent by two adjusting screws. Each adjusting screw has the effect of tilting about one axis in each case, the axes being at right angles to one another. U.S. Pat. No. 5,331,343 shows an imaging apparatus in which a lens configuration is accommodated in a v-shaped groove such that it can be rotated and displaced in the direction of the groove.

SUMMARY OF THE INVENTION

It is accordingly an object of the invention to provide an apparatus for producing a printing form that overcomes the above-mentioned disadvantages of the prior art devices of this general type, which, with little expenditure, permits exact beam alignment and positioning.

With the foregoing and other objects in view there is provided, in accordance with the invention, an apparatus for producing a printing form. The apparatus contains a holder for at least one printing form blank and at least one imaging module disposed movable relative to the printing form blank. The imaging module has at least one radiation source for producing image elements that accept printing ink. The radiation source is disposed aimed at a surface of the printing form blank and has an adjustable beam direction. A six-point mounting having three bearing locations accommodates the imaging module. The bearing locations have elements including spherical elements and bearing elements. The spherical elements rest on the bearing elements with one to three points, and for adjusting the beam direction, at least one of the elements of one of the bearing locations is disposed adjustably and defines an adjustable element.

The invention permits extremely fine adjustment of the point of incidence of write beams on a printing form blank. In the case of the simultaneous use of a plurality of radiation sources, it is ensured that no offset errors between the lines of adjacent write lines are produced. The setting of the point of incidence on the printing form blank is carried out once during a calibration operation during assembly. When a radiation source is replaced, only slight readjustment is necessary. The radiation sources are in each case mounted at three bearing locations on a total of six points. The bearing parts consist of hard materials, so that material deformations have no influence on the accuracy of the mount. It is advantageous if the bearing forces for an imaging module are introduced in such a way that the magnitudes of the force vectors acting on the six bearing points are virtually identical. The forces applied during fixing of an imaging module are accurately defined.

In accordance with an added feature of the invention, the bearing locations lie at corners of an isosceles triangle, in particular an equilateral triangle. The bearing locations lie in a plane located at right angles to the surface of the printing form blank, and one corner of the isosceles triangle faces the surface. Preferably, the bearing elements each contain two parallel cylindrical rollers. Alternatively, the bearing elements are prismatic shaped, in particular V-shaped.

In accordance with an additional feature of the invention, the bearing elements are fixed to the imaging module, and one of the spherical elements is displaceable.

In accordance with another feature of the invention, the spherical elements are fixed to the imaging module, and one of the bearing elements is displaceable.

In accordance with a further feature of the invention, the bearing elements have a common point of intersection. From the common point of intersection, the bearing elements exhibit an angle of 120 degrees to each other.

In accordance with another further feature of the invention, the adjustable element of one of the bearing locations faces the surface of the printing form blank and can be moved in a direction parallel to the surface.

In accordance with another added feature of the invention, the imaging module rests in the bearing locations by a spring force provided by a spring. The spring is connected between the imaging module and the bearing locations, the imaging module resting in the bearing locations by the spring force.

In accordance with a concomitant feature of the invention, a common slide is provided and the imaging module is one of a plurality of imaging modules disposed adjustably on the common slide. One of the spherical elements and the bearing elements is disposed on the common slide, and it being possible for the common slide to be positioned parallel to an axis of rotation of the holder carrying the printing form blank. The imaging modules are preferably disposed at equal intervals along the common slide, and the holder is preferably a printing form cylinder.

Other features which are considered as characteristic for the invention are set forth in the appended claims.

Although the invention is illustrated and described herein as embodied in an apparatus for producing a printing form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
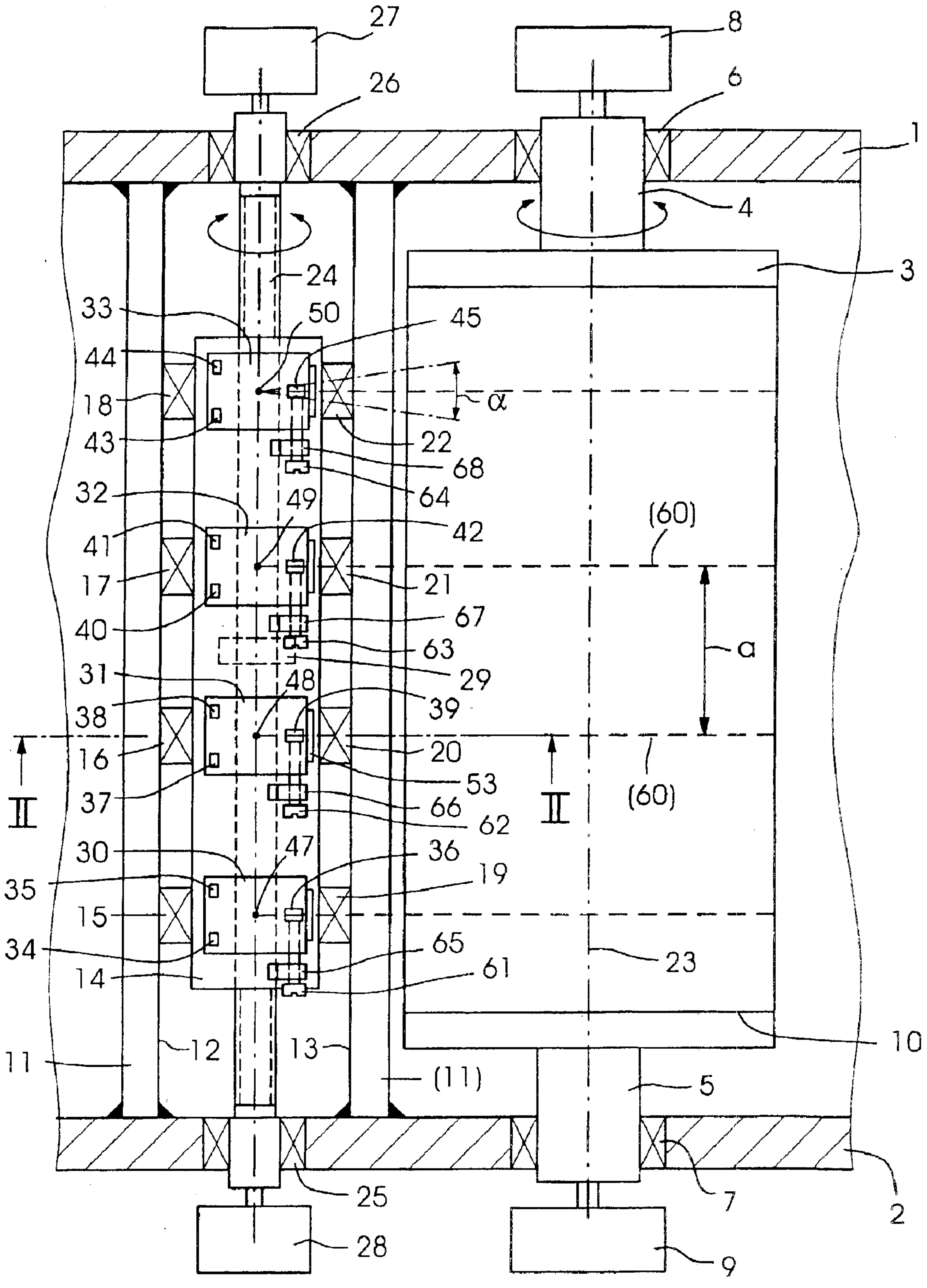
FIG. 1 is a diagrammatic, plan view of an apparatus for producing a printing form according to the invention.
Figure 2:
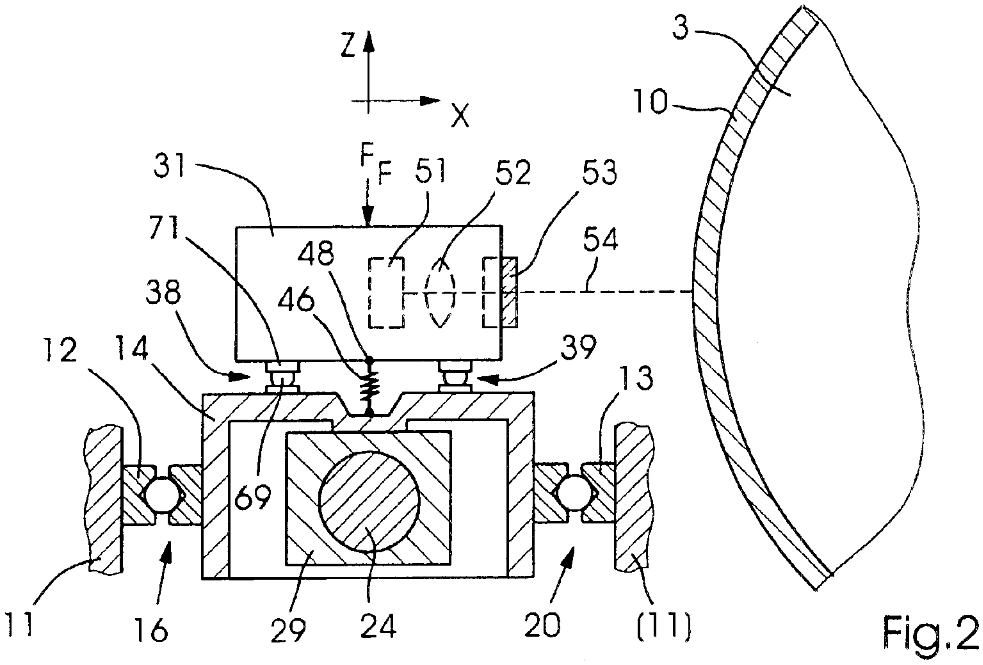
FIG. 2 is a sectional view of a detail of the apparatus taken along the line II—II shown in FIG. 1.

Referring now to the figures of the drawing in detail and first, particularly, to FIGS. 1 and 2 thereof, there is shown a schematic drawing relating to the production of a printing form. Between two sidewalls 1, 2 connected firmly to each other, a printing form cylinder 3 is rotatably mounted with its axle journals 4, 5 in bearings 6, 7. The axle journals 4 and 5 are coupled to a motor 8 and a rotary encoder 9. The printing form cylinder 3 bears a printing form blank 10. The sidewalls 1, 2 are connected by a cross-member 11, on which there are guide tracks 12, 13 for a slide 14. The slide 14 is mounted in the guide tracks 12, 13 by eight ball bearings 15–22 such that it can be displaced. The guide tracks 12, 13 lie parallel to an axis of rotation 23 of the printing form cylinder 3. The slide 14 has a U-shaped cross section, between whose limbs a screw drive is accommodated. The screw drive contains a threaded spindle 24, which is held in bearings 25, 26 in the sidewalls 1, 2. The ends of the threaded spindle 24 are coupled to a motor 27 and a rotary encoder 28. Seated on the threaded spindle 24 is a nut 29, which is coupled to the slide 14. Fixed to the slide 14 are four laser modules 30–33, which are each seated on three bearing locations 34–45. The bearing locations 34–45 lie in a plane that runs parallel to the axis of rotation 23. In the plan view according to FIG. 1, the bearing locations 34–45 of each laser module 30–33 form an isosceles triangle, the bearing locations 34, 35; 37, 38; 40, 41 and 43, 44 lying on the base of the respective triangle lying parallel to the axis of rotation 23. The bearing locations 36, 39, 42 and 45 located at the point of intersection of the equally long limbs face the printing form blank 10. The laser modules 30–33 are held in the bearing locations 34–45 by springs 46 (FIG. 2). The points of action 47–50 of the springs 46 on the respective laser module 30–33 lie centrally in the isosceles triangle that in each case is formed by the bearing locations 34–45. As shown in more detail in FIG. 2, the springs 46 are tension springs, which are in each case anchored on the laser module 30–33 and on the slide 14 and which pull the laser modules 30–33 against the slide 14 in each case with a force $F_F$. In each laser module 30–33 there is a radiation source 51 with at least one laser, an optical system 52 for beam shaping and beam deflection and a protective lens 53. The beam direction 54 of a beam leaving a laser module 30–33 intersects the axis of rotation 23, apart from slight deviations.

Figure 3:
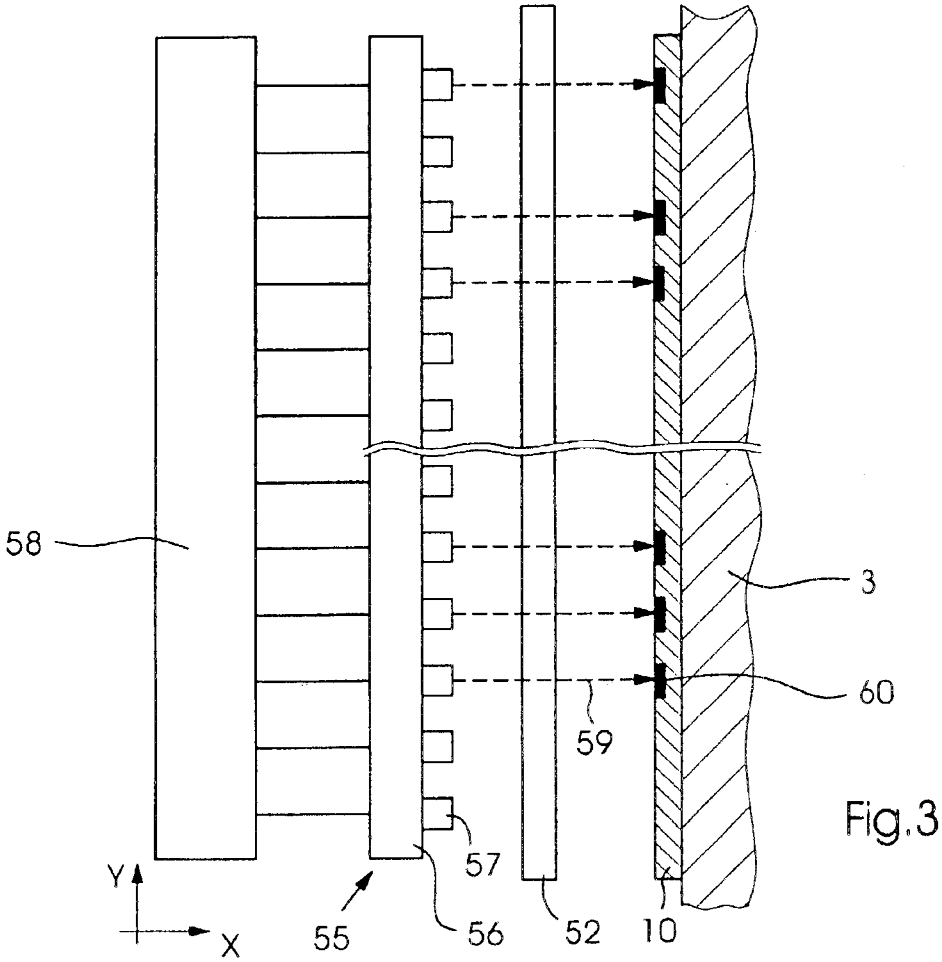
FIG. 3 is a schematic drawing of an apparatus for imaging with laser diodes.
Figure 4:
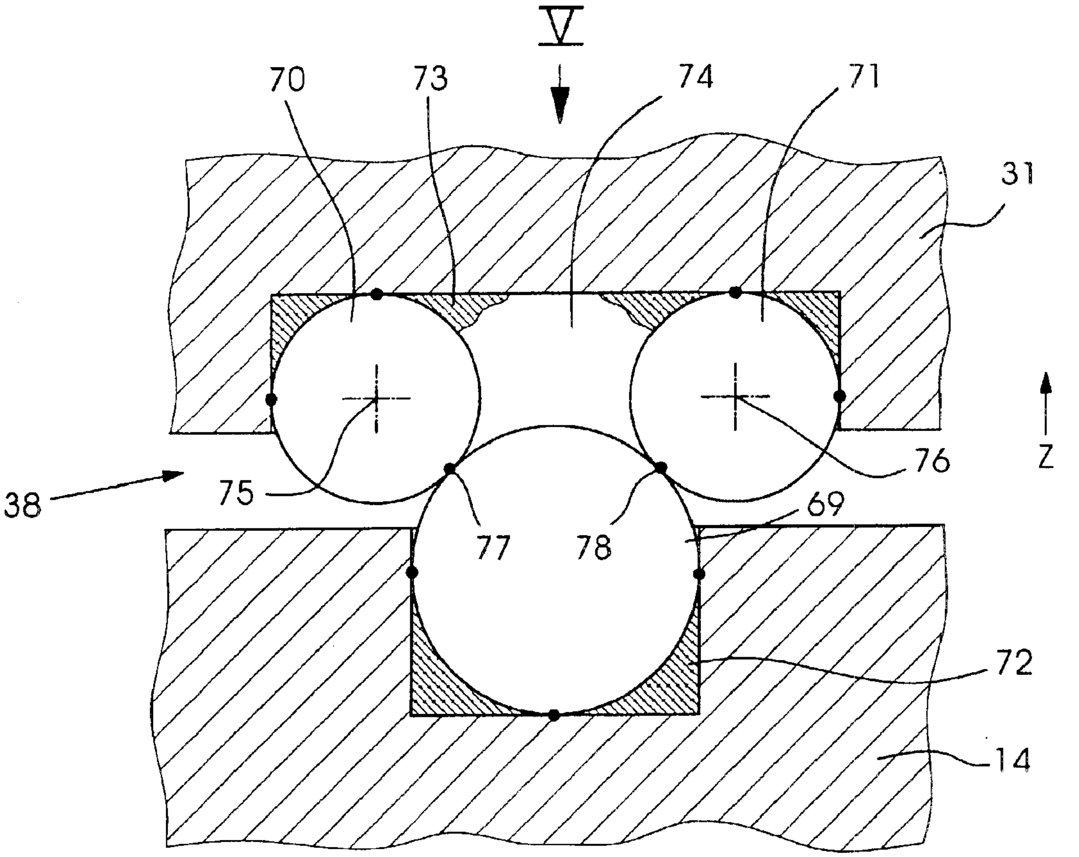
FIG. 4 is a sectional view of a bearing location containing two cylinders and a sphere.
Figure 5:
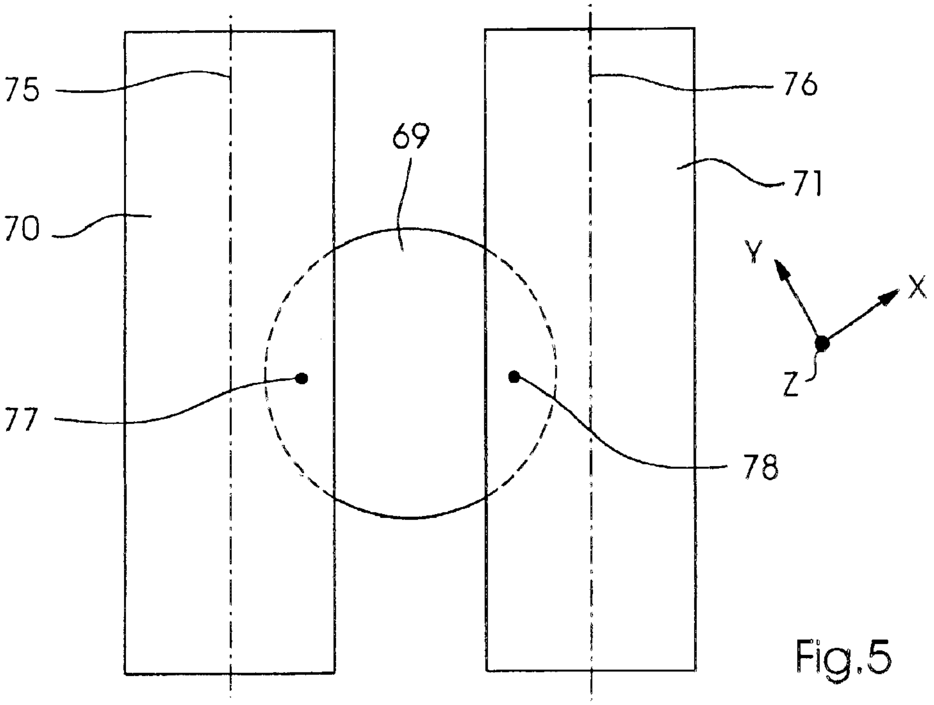
FIG. 5 is a plan view of a detail of the bearing location according to FIG. 4.

FIG. 3 shows a configuration of the radiation source 51 having a laser diode array 55. The laser diode array 55 contains a bar 56 on which a large number of individually driveable laser diodes 57 are disposed. The laser diodes 57 are at equal intervals and lie on a line that is parallel to the axis of rotation 23. The laser diodes 57 are connected to a control device 58. When the laser diode 57 is activated by the control device 58, a laser beam 59 is emitted, which is focused onto a surface of the printing form blank 10 by the optical system 52 and produces an image point 60 that accepts printing ink on the surface. The beam directions of the laser beams 59 are all parallel.

During the assembly of the apparatus for producing a printing form, and in the event of replacement of a defective laser module 30–33, it must be ensured that the distances a between two image points 60 produced by different laser modules 30–33 correspond to a predefined value in the y direction. If, during test imaging, the result is that there are deviations from a predefined value, then readjustment of at least one laser module 30–33 is necessary, for which purpose the laser modules 30–33 are disposed such that they can be adjusted. En order to adjust the laser modules 30–33 on the slide 14, adjusting screws 61–64 in holding blocks 65–68 are provided (FIG. 1). The adjusting screws 61–64 engage without play on a bearing element of one of the bearing locations 36, 39, 42, 45 in each case which faces the printing form blank 10. When an actuating screw 61–64 is operated, the corresponding bearing element on the laser module 30–33 is carried along, so that the laser module 30–33 completes a rotation about the z-axis. The beam direction 54 can therefore be adjusted over an angular range $\alpha$, which lies in the x-y plane.

Each of the bearing locations 34–35 contains two bearing elements, which are each assigned to the slide 14 and the laser module 30–33. In the exemplary embodiment in FIGS. 1 and 2, spheres 69 and cylindrical rollers 70, 71 are provided as bearing elements. The spheres 69 are embedded with an adhesive 72 in the slide 14 or in a component connected to the slide 14. The cylindrical rollers 70, 71 are embedded with an adhesive 73 in a parallel groove 74 such that their axes 75, 76 are parallel. The axes 75, 76 lie in a plane at right angles to the z-axis. The lines of symmetry of the axes 75, 76 intersect at the center of the circumcircle of the triangle that is formed by the three bearing locations 34–45 of a laser module 30–33. At each bearing location 34–45, a laser module 30–33 rests on two points of contact 77, 78 on the sphere 69. Therefore, each laser module 30–33 is mounted on six points of contact 77, 78. If, by using an adjusting screw 61–64, a laser module 30–33 is rotated about the z-axis, then the contact between the spheres 69 and the cylindrical rollers 70, 71 is maintained while maintaining the force $F_F$ of the spring 46. The points of contact 77, 78 move slightly on the surface of the spheres 69. The point of incidence of the laser beam 59 on the surface of the printing form blank 10 is corrected in the y-direction. Since the laser module 30–33 does not carry out a pure rotation about the z-axis, the position of the point of incidence also changes in the z and x directions, but this can readily be corrected by controlling the time of activation of the laser diode 57 and by a focusing configuration in the laser beam path.

Figure 6:
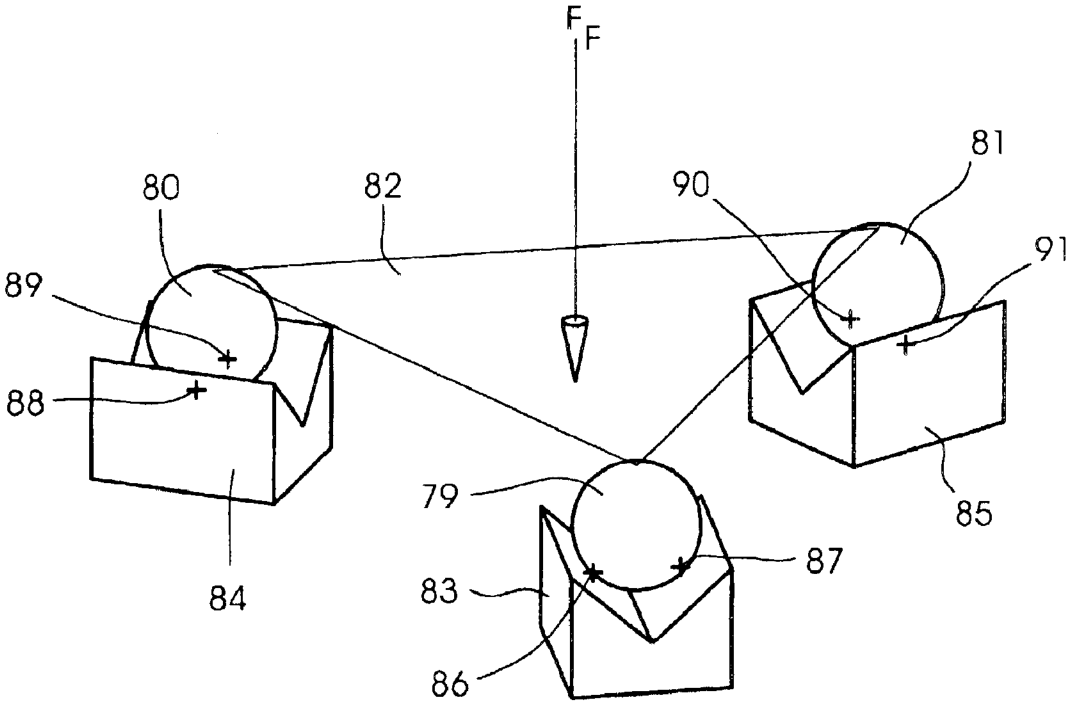
FIG. 6 is a perspective view of a six-point mounting with three prisms.

A further variant of a six-point mounting for a laser module is illustrated in a perspective illustration in FIG. 6. Use is made of spheres 79–81, which are fixed to a laser module in a plane 82. The spheres 79–81 are mounted in three v-shaped prisms 83–85 with the force $F_F$ of a spring. The result is six points of contact 86–91. If, as shown in detail in FIG. 7, one of the prisms 83–85 is disposed such that it can be displaced, rotation of a laser module 92, 93 can be achieved.

Figure 7:
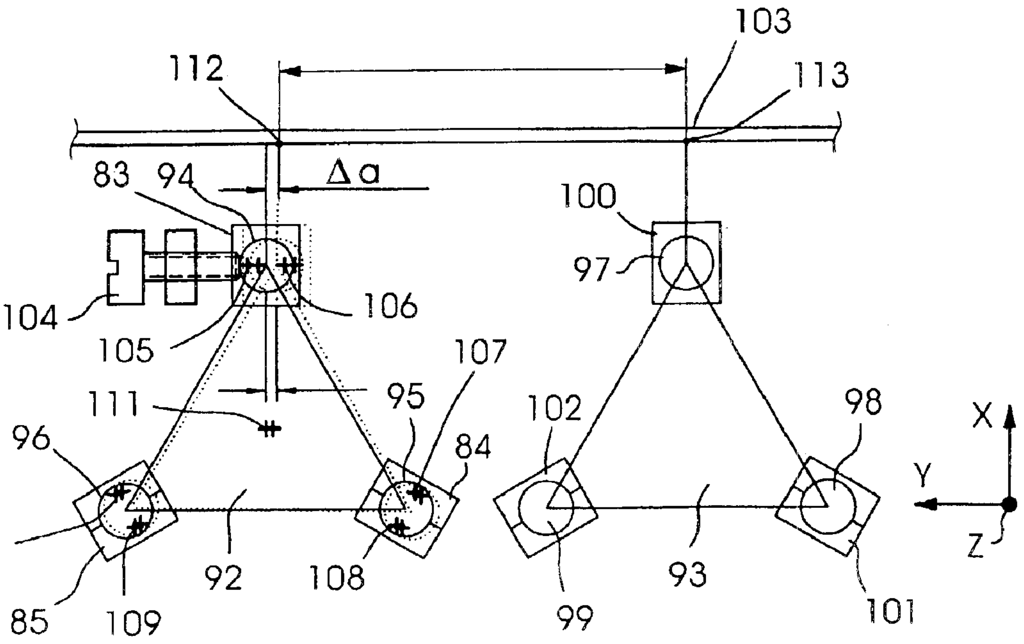
FIG. 7 is a schematic drawing of a mounting for a laser module.

FIG. 7 shows in schematic form two laser modules 92, 93 having six spheres 94–99, which are seated on six prisms 83–85, 100–102. The spheres 94–99 and the prisms 83–85; 100–102 form bearing locations at the corners of equilateral triangles, an adjustable bearing location facing the surface of a printing form 103. On the laser module 92, it is demonstrated how a displacement of the prism 83 acts in the y-direction. If, for example by an adjusting screw 104, the sphere 94 is displaced in the y-direction by an amount Δa, then the points of contact 105, 106 on the prism 83 are substantially likewise offset in the y-direction. The point of contact 107–110 and the force introduction point 111 experience an offset both in the y and in the x-direction. The shifted position of the laser module 92 is illustrated dashed. As a result of the force acting at the force introduction point 111, the contact between the laser module 92 and the prisms 83–85, 100–102 connected to a slide at the points of contact 105–110 is maintained. Following the adjustment of the laser module 92, the point of incidence 112 has the predefined distance a from the point of incidence 113 of the adjacent laser module 93.

Figure 8:
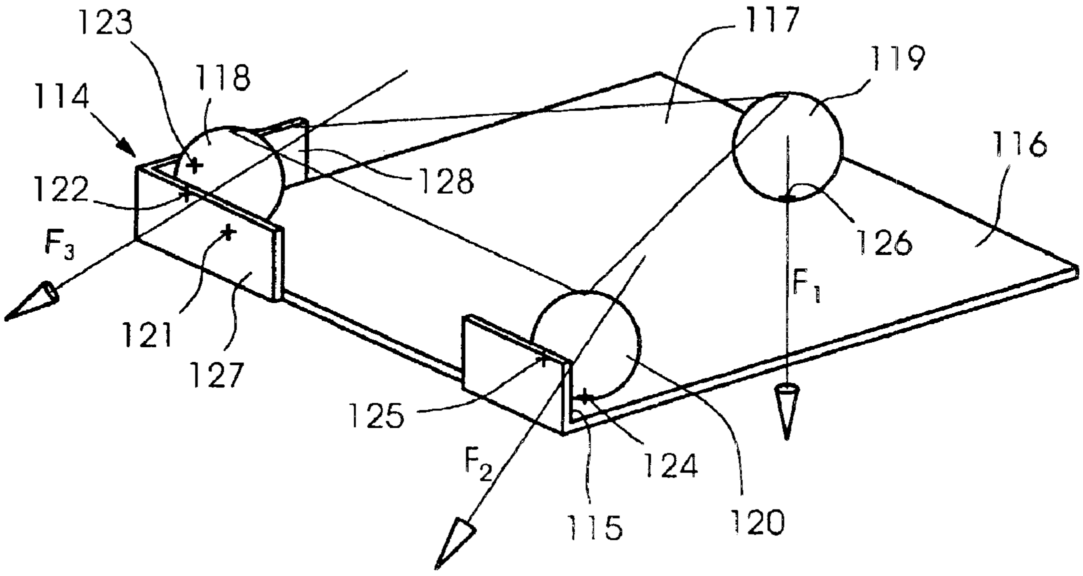
FIG. 8 is a perspective view of the six-point mounting with one corner, one prism and a surface.

FIG. 8 shows a further variant of the six-point mounting. A corner 114, a prism 115 and a supporting plane 116 are formed on a non-illustrated slide. Fixed to a laser module 117 are three spheres 118–120, which rest with three points of contact 121–123 on the corner 114, with two points of contact 124–125 on the prism 115, and with one point of contact 126 on the supporting plane 116. The laser module 117 is acted on by clamping forces $F_1$–$F_3$ such that when the corner 114 is displaced in the direction y, the contact at the six points of contact 121–126 is always maintained. The clamping force $F_3$ running in the direction of the corner 114 is in this case chosen to be greater than the clamping force $F_2$ in the direction of the prism 115. The clamping force $F_2$ in the direction of the prism 115 is greater than the clamping force $F_1$ in the direction at right angles to the supporting plane 116.

Figure 9:
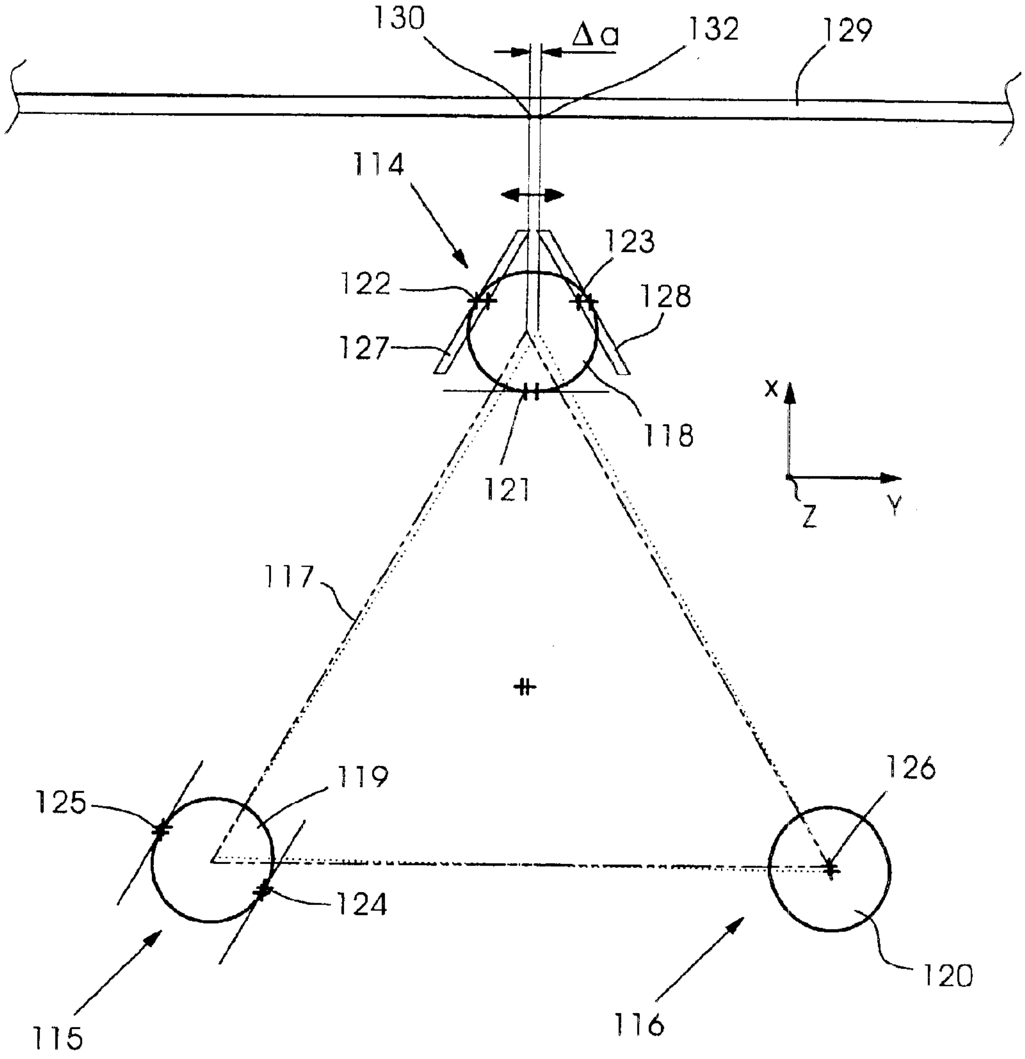
FIG. 9 is a schematic drawing relating to the adjustment of the six-point mounting according to FIG. 8.

FIG. 9 shows the adjustment of the laser module 117 by the six-point mounting according to FIG. 8. The corner 114 is disposed in such a way that two walls 127, 128 standing in the z-direction form an acute angle, which points in the direction of the surface of a printing form blank 129. The base of the corner 114 lies in a plane with a side surface of the prism 115 and the supporting plane 116. The corner 114 is disposed on a slide such that it can be displaced in the y-direction. When the corner 114 is displaced by a small amount Δa, the result is the position of the laser module 11 illustrated by dots. The point of incidence 130 of a laser diode is likewise displaced in the y-direction, so that the result is a new point of incidence 131. While the points of contact 121–123 are displaced substantially in the y-direction, the points of contact 124–126 are given displacement components in the x and y directions.

The invention is not limited to the exemplary embodiment illustrated. For example, the radiation source can be provided once or many times. Individual radiant sources or a large number of radiant sources may be present in a radiation source, and experience common adjustment. In addition to lasers, LEDs or other radiant sources can also be used which have the capacity of setting an image point or a non-image point on a printing form blank. The printing form blank can be clamped on a printing form cylinder or formed in the manner of a sleeve. The positive or negative imaging can likewise take place on the surface of a suitable printing form cylinder. The invention can likewise be used in flat bed exposers and internal drum exposers. The apparatus according to the invention can be integrated in printing presses. The rotation of the spindle 24 and of the printing form cylinder 3 by the motors 8, 27, the processing of the rotary encoder signals and the driving of the laser diodes 57 can be controlled in a synchronized manner by the common control device 58. It is possible to register the position of the laser modules 30–33 by measurement and to carry out the adjustment automatically by actuating motors. In this case, the position of the laser modules 30–33 can be readjusted continuously if deviations occur during imaging operation.

We claim:

1. An apparatus for producing a printing form, comprising:

a holder for at least one printing form blank;

at least one imaging module disposed movable relative to the printing form blank, said imaging module having at least one radiation source for producing image elements that accept printing ink, said radiation source disposed aimed at a surface of the printing form blank and having an adjustable beam direction; and a six-point mounting having three bearing locations and accommodating said imaging module, said bearing locations lying at corners of an isosceles triangle in a plane parallel to the beam direction, with one corner of the isosceles triangle facing said surface and said bearing locations having elements including spherical elements and bearing elements, said spherical elements resting on said bearing elements with one to three points, and for adjusting the beam direction, at least one of said elements of one of said bearing locations being disposed adjustably and defining an adjustable element.

2. The apparatus according to claim 1, wherein said bearing elements each contain two parallel cylindrical rollers.

3. The apparatus according to claim 1, wherein said bearing elements are prismatic shaped.

4. The apparatus according to claim 3, wherein said bearing elements are V-shaped.

5. The apparatus according to claim 1, wherein said bearing elements are fixed to said imaging module, and one of said spherical elements is displaceable.

6. The apparatus according to claim 1, wherein said bearing elements have a common point of intersection.

7. The apparatus according to claim 6, wherein from said common point of intersection, said bearing elements exhibit an angle of 120 degrees to each other.

8. The apparatus according to claim 1, further comprising a common slide, said imaging module is one of a plurality of imaging modules disposed adjustably on said common slide, one of said spherical elements and said bearing elements disposed on said common slide, and it being possible for said common elide to be positioned parallel to an axis of rotation of said holder carrying the printing form blank.

9. The apparatus according to claim 8, wherein said imaging modules are disposed at equal intervals along said common slide.

10. The apparatus according to claim 8, wherein said holder is a printing form cylinder.

11. The apparatus according to claim 1, wherein said isosceles triangle is an equilateral triangle.

12. An apparatus for producing a printing form, comprising:

a holder for at least one printing form blank;

at least one imaging module disposed movable relative to the printing form blank, said imaging module having at least one radiation source for producing image elements that accept printing ink, said radiation source disposed aimed at a surface of the printing form blank and having an adjustable beam direction; and a six-point mounting having three bearing locations and accommodating said image in module said be in locations having elements including spherical elements fixed to said imaging module and bearing elements, one of said bearing elements being displaceable, said spherical elements resting on said bearing elements with one to three points, and at least one of said elements of one of said bearing locations being disposed adjustably and defining an adjustable element for adjusting the beam direction.

13. An apparatus for producing a printing form, comprising:

a holder for at least one printing form blank;

at least one imaging module disposed movable relative to the printing form blank, said imaging module having at least one radiation source for producing image elements that accept printing ink, said radiation source disposed aimed at a surface of the printing form blank and having an adjustable beam direction; and a six-point mounting having three bearing locations and accommodating said imaging module, said bearing locations having elements including spherical elements and bearing elements, said spherical elements resting on said bearing elements with one to three points, and at least one of said elements of one of said bearing locations being disposed adjustably and defining an adjustable element for adjusting the beam direction, said adjustable element of one of said bearing locations facing the surface of the printing form blank and being movable in a direction parallel to the surface.

14. An apparatus for producing a printing form, comprising:

a holder for at least one printing form blank;

at least one imaging module disposed movable relative to the printing form blank, said imaging module having at least one radiation source for producing image elements that accept printing ink, said radiation source disposed aimed at a surface of the printing form blank and having an adjustable beam direction; and a six-point mounting having three bearing locations, said imaging module resting in said bearing locations by a spring force, said bearing locations having elements including spherical elements and bearing elements, said spherical elements resting on said bearing elements with one to three points, and at least one of said elements of one of said bearing locations being disposed adjustably and defining an adjustable element for adjusting the beam direction.

15. An apparatus for producing a printing form, comprising:

a holder for at least one printing form blank;

at least one imaging module disposed movable relative to the printing form blank, said imaging module having at least one radiation source for producing image elements that accept printing ink, said radiation source disposed aimed at a surface of the printing form blank and having an adjustable beam direction;

a six-point mounting having three bearing locations and accommodating said imaging module, said bearing locations having elements including spherical elements and bearing elements, said spherical elements resting on said bearing elements with one to three points, and at least one of said elements of one of said bearing locations being disposed adjustably and defining an adjustable element for adjusting the beam direction; and a spring defining a spring force and connected between said imaging module and said bearing locations, said imaging module resting in said bearing locations by the spring force.

* * * * *

UNITED STATES PATENT AND TRADEMARK OFFICE

CERTIFICATE OF CORRECTION

PATENT NO. : 6,876,378 B2
DATED : April 5, 2005
INVENTOR(S) : Andreas Detmers et al.

It is certified that error appears in the above-identified patent and that said Letters Patent is hereby corrected as shown below:

Title page,
Item [30] Foreign Application Priority Data, should read as follows:
-- Aug. 2, 2002 (DE) ........... 102 23 642 --

Signed and Sealed this

Seventh Day of June, 2005

JON W. DUDAS
*Director of the United States Patent and Trademark Office*